United States Patent [19]

Parveris

[11] Patent Number: 5,555,607
[45] Date of Patent: Sep. 17, 1996

[54] RETAINING DEVICE

[76] Inventor: John I. Parveris, Unit 4, 17 Olive Grove, Mentone, 3194, Victoria, Australia

[21] Appl. No.: 397,217
[22] PCT Filed: Sep. 7, 1993
[86] PCT No.: PCT/AU93/00458
§ 371 Date: Mar. 8, 1995
§ 102(e) Date: Mar. 8, 1995
[87] PCT Pub. No.: WO94/05942
PCT Pub. Date: Mar. 17, 1994

[30] Foreign Application Priority Data

Sep. 9, 1992 [AU] Australia .................................. PL4616
Oct. 6, 1992 [AU] Australia .................................. PL5131

[51] Int. Cl.$^6$ ........................................................ F16G 11/00
[52] U.S. Cl. ........................... 24/129 R; 24/130; 24/336; 24/545
[58] Field of Search ............................ 24/129 R, 129 D, 24/129 W, 130, 115 F, 339, 329, 336, 543, 545; 248/74.1, 74.3

[56] References Cited

U.S. PATENT DOCUMENTS

| 562,528 | 6/1896 | Hakansson | 24/129 R |
|---|---|---|---|
| 1,020,963 | 3/1912 | Cake | 24/130 |
| 4,195,807 | 4/1980 | Llaugé | 248/74 A |
| 4,404,712 | 9/1983 | Northe et al. | 24/129 R |
| 4,467,988 | 8/1984 | Kraus | 248/68.1 |
| 4,655,424 | 4/1987 | Oshida | 248/73 |
| 4,774,742 | 10/1988 | Johnson | 24/129 R |
| 4,993,961 | 2/1991 | Hisatomi et al. | 439/125 |
| 5,133,616 | 7/1992 | Oyaide et al. | 400/635 |
| 5,408,728 | 4/1995 | Wisniewski | 24/336 |

FOREIGN PATENT DOCUMENTS

| 3557568 | 10/1969 | Australia . | |
|---|---|---|---|
| 0649899 | 10/1962 | Canada | 24/339 |
| 2921891 | 12/1980 | Germany . | |
| 2145147 | 3/1985 | United Kingdom | 24/545 |

Primary Examiner—Victor N. Sakran
Attorney, Agent, or Firm—Biebel & French

[57] ABSTRACT

A retaining device in the form of a clip (11, 13, FIGS. 1 and 2) or a combined clip and plug (12, FIG. 3) is provided for keeping a power cord or appliance cord or similar (16)in a neat and organized manner whether in use or in storage by maintaining the cord in loops. Clip (11, 12, 13) is provided with an opening (26, 126) for receiving the cord (16) defined between a resiliently movable arm (31, 61) and another arm (24, 124). The resiliently movable arm (31, 61) is biased towards the other arm (24, 124) to maintain the cord securely. In some embodiments of the clip other openings (43, 143, 45) are provided to store one or more loops of cord. The arms defining the loops are optionally provided with indentations (33, 34, 35, 36, 37, 38) preferably in corresponding pairs for retaining the cord therebetween.

23 Claims, 2 Drawing Sheets

RETAINING DEVICE

The present invention relates to a retaining device in general, and in particular to a retaining device for retaining a flexible member, such as for example, a cord. In particular the present invention relates to an improved retainer in the form of a clip for retaining electrical cords and the like as an aid for keeping such cords in a tidy and organised manner both during storage and during operation of the appliance to which the cord is attached. Even more particularly, the present invention relates to a retaining clip for attaching to the flex or power cord of an electrical appliance so as to enable the flex or cord to be wound into one or more turns and to be kept in a tidy and organised manner. Additionally, winding the cord into a number of loops has the effect of shortening the effective length of the cord making the use of the appliance more manageable and controllable. The retaining clip of the present invention may be used when the appliance is being stored or when the appliance is being used.

It is to be noted that although the present invention will be described with particular reference to a retaining clip for an electrical cord, the scope of the present invention is not limited to this form of the invention, but rather the scope of the invention is more extensive so as to include other applications and uses of the clip as well as to other forms of the clip by relating to retaining devices in general.

Further, it is to be noted that the use of the term "cord" in the present specification is not meant to be limiting to the scope of the invention by restricting the application of the device of the present invention to use with electrical cords, but rather this term is used merely for the sake of clarity of understanding and brevity of description only. The term "cord" includes within its scope any member or article that is capable of being held or retained, and in particular relates to any flexible member which is capable of being wound upon itself into loops or turns and includes flexible members having any cross-sectional shape, such as for example rope, string, wire, hose, ribbon, cord, electrical conduit, flat wire and the like. In fact anything that has a cylindrical or substantially cylindrical cross-section or flat, square, rectangular, polygonal or similar cross-section may be retained by the clip of the present invention. Furthermore, the device of the present invention may be used with members of a number of different diameters or sizes. Not only can a single article or member be retained by the device of the present invention, but two or more similar or dissimilar articles or elements may be retained simultaneously by a single device or two or more devices.

Electrical cords, such as extension cords or power cords of electrical equipment, are generally stored by winding the electrical cord in loops about itself or around the electrical appliance to which it is attached and roughly jamming the plug at the end of the cord within one or more of the loops of cord caused by such winding. Storage of appliances with electrical cords in this manner is likely to damage the plug or connection of the plug to the electrical cord or connection of the cord to the appliance or the cord itself since a deal of force or manipulation is often required to unwind the cord and plug when it is desired to use the cord or appliance which amount of force exceeds that for which the cord and plug were manufactured.

Further, the jamming of the plug or the end of the cord in order to maintain the cord in a wound position is often not successful in retaining the cord together and usually results in messy unwinding and tangling of the cord which could lead to further inadvertent damage to the cord, plug, appliance or all three. Therefore, there is a need for a simple, quick, easy and convenient means of storing controlling or organising a cord or two or more cords together or appliance and cord by retaining the cord in tidy loops when the appliance is being stored and/or in use.

Another known method of controlling, organising or storing electrical cords is to use a separate tape or length of string or similar tying element to tie the loops of the stored wound electrical cord together or to the appliance. However, this method requires that a separate tying element is available, that two hands be freely available to enable the cord to be tied, and is generally not a quick and easy or convenient method for storage, particularly if the cord or appliance is to be alternatively stored and used frequently. Another problem of untidy or uncontrolled cords results from using appliances in situations where the length of cord is greater than is warranted or needed for that particular application since the excess part of the cord may become entangled or be cut or otherwise damaged by the appliance or operator of the appliance or may cause a nuisance or hindrance to the operator when working with the appliance. Therefore, there is a need to be able to selectively adjust the length of the cord attached to the appliance for each particular job or application. One way of doing this is to keep the part of the cord not needed or required or excess of cord securely held in a number of loops. However, it is difficult to quickly and easily retain the loops securely in place, particularly when the appliance is being used. The retaining device of the present invention sets out to overcome this problem by being able to be used to hold manifold loops or turns of the cord in a safe, tidy and organised manner, both when the appliance is being used and when it is being stored.

A further problem associated with the use of electrical appliances having power cords is the proliferation of such appliances in the home and work place. As more and more electrical appliances become available at reasonable cost, more and more appliances are being used, such as for example in the kitchen of a domestic or commercial dwellings which leads to benches, work tops and work areas generally becoming cluttered by increasing numbers of power cords since each appliance is provided with its own cord. Often the cords become entangled with each other or with other implements which are sharp and dangerous which generally causes a nuisance. Therefore, there is a need of a quick, easy, convenient and cheap way of keeping a number of different power cords of different appliances in a tidy and organised manner which does not occupy too much space and which allows the appliances to be used. The present invention sets out to overcome this problem by providing a retaining clip which can clip and maintain the different cords together in a neat and tidy array.

A further problem relates to the use of two extension cords jointed together by a complementary plug and socket. Often when two power or extension cords are joined together by means of the conventional plug and sockets the cords disconnect during use due to the tension applied to one of the cords by pulling on the cord or by using the alliance. Therefore, there is a need for a device which can be useful in maintaining connection between the two cords in use.

It is therefore an object of this invention to provide an improved cord retaining apparatus, in the form of a clip or similar, which overcomes one or more of the aforementioned problems or disadvantages of known means of storing or using cords, including extension cords.

According to one aspect of the present invention there is provided a retaining device for holding at least one portion of an article or two or more articles, such as a cord or the like, characterised in that the device comprises a first opening for receiving a first part of the article, said opening being defined between two partially spaced apart portions of the device which are connected to different locations of the body of the device, wherein one of the two partially spaced apart portions of the device is resilient or resiliently connected to the body to provide a bias of movement in the direction towards the other portion so that the article or portion of the article inserted into the opening is held securely in place between the two portions by the action of the resilient portion.

According to another aspect of the present invention there is provided a cord retaining device, for holding at least one portion of a cord, such as a power cord or the like, the cord retaining device comprising a first opening for receiving a first part of the cord, said opening defined between two partially spaced apart portions of the device connected to different parts of the body of the device and extending substantially in a first direction, and a second opening for receiving a second part of the cord, or a second cord, said second opening extending substantially in the same direction as the first opening, and an arm provided in at least one opening said arm being resiliently movable transverse to the lengthwise extending direction of the cord or cords when in one or both of the openings such that the cord is held within one or other of the openings, by the action of the resilient arm towards one of the spaced apart portions.

Preferably the first opening of the cord retaining device or apparatus of the present invention is substantially a U-shaped opening or U-shape like opening and the movable arm forms an extension of one side of the opening and in use extends from one side defining the U-shape towards the base of the U-shape whereby the cord retaining device holds one or more portions of the cord or cords between the movable arm and the other side defining the U-shaped opening.

Preferably, the cord retaining device is a clip that holds at least two portions of the cord so that the clip maintains the cord in a stored configuration, one portion being located in one opening, the other in another opening Preferably, the cord retaining device comprises two openings for holding separate portions of the one cord or separate cords whereby the second opening may also include a resiliently movable arm defining one side of the second opening. Preferably, one cord is receivable in the first opening and a second cord is receivable in the second opening.

Typically, the device of the present invention is provided with three openings in which one of the openings is divided into two openings by resiliently mounted arm being located transversely in that opening. In this case the third opening extends at least partially circumferentially around the first and second openings.

Preferably the arm and the sides of the opening associated with the arm holding the cord co-operate to form a plurality of cord retaining positions, such as for example indentations or undulations, wherein the plurality of positions are separately dimensioned to hold multiple cords of different dimensions, and cords may be selectively positioned in the different sized cord retaining positions in accordance with the size or diameter of the cord. Preferably, the size of the opening or openings vary over their respective lengths. Typically, the resilient arm or arms are curved or tapered.

Preferably, the particular cord retaining positions are defined by separate indentations in the arm and an undulating curved side of the opening, or pairs of corresponding indentations and undulations located in opposite sides of the opening or in the sides of the arm and opening facing each other.

Preferably, the arm or arms are molded integrally with the body of the cord retaining device and the arm or arms are resiliently hinged to the body as a result of bending of the arm from an initial molded position into an in use position in which the arm is located in one of the openings.

In order that the invention is more readily understood particular embodiments thereof will now be described by way of example only with reference to the accompanying drawings in which.

Figure 1:
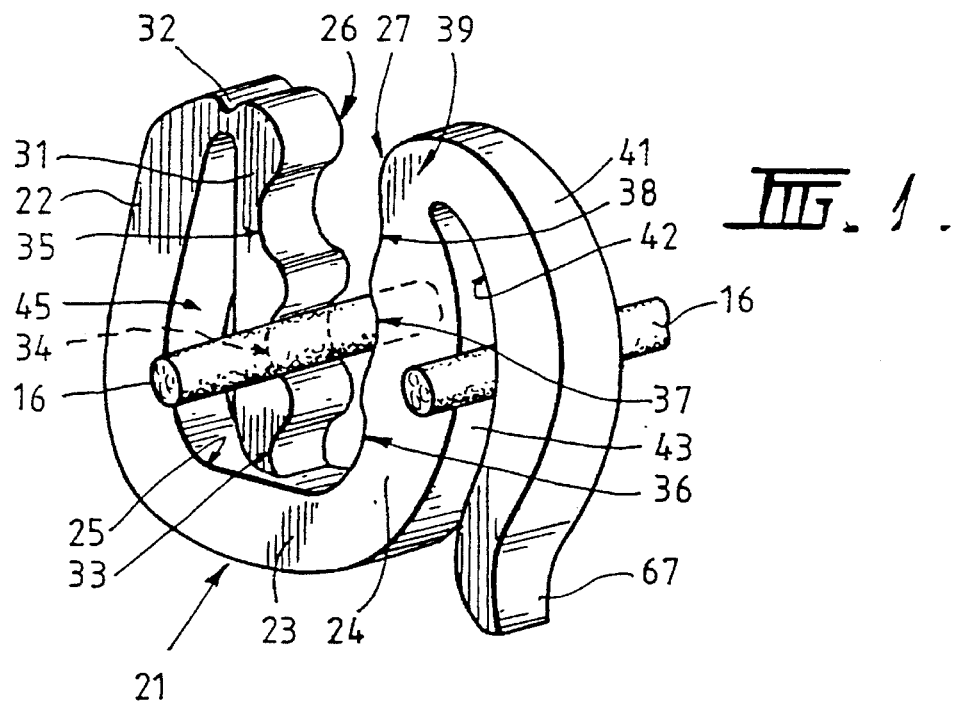
FIG. 1 is a perspective side view of one form of the cord retaining device in accordance with one embodiment of the present invention.

Referring to the drawings, FIG. 1 shows one embodiment of the present invention in the form of a clip generally denoted as 11 in which portions of an electrical cord, such as the power supply cord of an appliance, can be retained in order to retain a tidy organisation of the cord, such as for example for storage of the appliance when not in use. Clip 11 comprises a generally U-shaped main body portion 21 defining an opening 26 through which an electrical cord 16 can be passed so that the lengthwise extending direction of the cord generally extends in a direction generally transversely to the direction of the opening 26 of the clip. Main body portion 21 is generally U-shaped having a base 23 forming the web of the U shape located between upright extending sides 22 and 24 on either side such that base 23 forms an interconnecting web between sides 22, 24. In order to impart strength to the device 11, base 23 and upright extending side 24 may be of a thicker construction than that of side 22 or both sides 22, 24 may be of the same or similar sized construction or in other embodiments side 22 may be of a thicker construction. Hingedly attached to the distal end of upright extending side 22 is arm 31 which is hinged at point 32 where arm 31 joins to side 22 in such a manner so that the arm 31 may be deflected or slightly moved in use. Arm 31 is biased towards the upright extending side 24 which is the other side of the opening to which arm 31 is resiliently mounted. Arm 31 is thus resiliently mounted to the body 21 and is capable of transverse deflecting movement to a small extent in opening 26. Arm 31 is arranged so as to extend into the opening 26 in a direction towards base 23 of the U-shaped body 21 but is spaced apart from the internal surface 25 of base 23 so as to maintain a clearance between the distal or free end of moving arm 31 and the internal surface 25 of base 23 forming the internal end of the opening 26. Arm 31 in effect divides opening 26 into two distinct portions or openings, one of which is denoted by reference numeral 26, the other opening being denoted as 45 (which will be described in more detail later). The moving arm 31 is provided with curved indentations 33,34,35 along the side facing the inboard surface 27 of side 24. Indentations 33,34,35 are more or less aligned and cooperate with corresponding indentations or undulations 36,37,38 provided on the inboard facing side 27 of side 24 forming the other side of the opening 26 in order to hold cords of different sizes in opening 26 between one pair or other pair of corresponding indentations 33,36 or 34,37 or 35,38 which will be described in more detail below.

Clip 11 further includes a second generally arcuate arm 41 which is integrally attached to the distal end of or is an extension of side 24 and is shaped so as to curve back around the outer surface of side 24 and perhaps optionally a part of the outer surface of base 23. In one embodiment arm 41 could be a duplicate of body section 21 together with moving arm 31. However, as shown in FIG. 1, second flexible arm 41 is joined to the end of side 24 and extends outwardly in an arc curved around the outer surface of side 24, and is capable of resilient movement towards and away from side 24. A further opening 43 is defined between the inboard surface of second arm 41 and the outboard surface of side 24. Opening 43 is generally arcuate and is tapered towards its proximal end and is dimensioned to receive and resiliently hold a further portion of the cord that is held in the first opening 26 or to hold a second cord. To be able to accommodate cords of different size diameters or cross-sections the opening 43 is tapered as well as being curved so that cords of thinner size can be held further into the opening towards the proximal end or junction 39 of arm 41 with side 24 than cords of a larger size which are held further towards the distal end of arm 41. The curvature of the curved inboard surface 42 of flexible arm 41 ensures that the cords do not fall out of the opening, but are held by the curved flexible arm being resiliently joined to the remaining portion of the clip such as at point 39 where arm 41 joins side 24. Therefore, the upright extending side 24 which is performing a dual function must be of a dimension or material so as to be able to provide a sturdy base so that when the curved flexible arm 41 is moved away from the upright extending side 24 the flexible arm 41 tends to resiliently return to a position spaced from the upright extending side 24 but at a distance able to hold the relevant sized cords. The tip or free end 67 of curved flexible arm 41 is tapered in a direction toward the extreme tip of the arm and extends away from the outboard side of side 24 so as to define a larger sized entry or mouth to opening 43. This construction is beneficial to allow for easy insertion of the cords into the opening 43 and to act as a lever for moving the curved flexible arm 41 away from the rest of the body 21 and in particular away from the upright extending side 24 in order to enlarge the second opening 43 to insert cords therein. This enlargement of the opening 43 will enable the cord to be inserted further into the opening so that it is more firmly resiliently held and also allow the opening to be expanded so that the cord can be pulled through the opening 43 or so that the entire clip 11 can be moved along the cord in order to tighten or more neatly organise the cord into loops in a final storage configuration for the cord. Further, tapered end 67 of the curved flexible arm 41 is tapered outwardly from side 24 in order to separate the loops of the cord to be collected such that one or more portions of the cord are inserted into the second opening 43 whilst the remaining loops of the cord remain outside the clip 11 if desired.

Therefore, in use the clip 11 may be used to maintain an extension cord 16 or the like in an organised manner. In use of this form of clip 11 a portion of the extension cord 16 is inserted into the opening 26 whereby it is held in place in one pair of indentations 34,37 (as shown) by the action of arm 31 bearing towards the internal side 27 of side 24. The cord 16 is usually held firmly by the clip but not so firmly that the clip is prevented from being able to be rotated around the cord upon finger pressure being applied to the clip. The cord 16 is then wound into a particular configuration about clip 11 and clip 11 is rotated to a suitable position so that another portion of the extension cord nearer to the other end of the cord can be inserted into the second opening 43 and be resiliently held between the inner curved side 42 of flexible arm 41 and the outboard surface of side 24 in one example of the way in which clip 11 can be used.

This form of the clip can be made from molded plastic and in one particular preferred form may include arm 31 being a more or less straight continuation of the upright extending side 22 such that side 22 and arm 31 are molded virtually in a straight line. The clip may be made with hinge marks or indentations 32 such that prior to use of clip 11 the arm 31 can be bent at the hinge mark 32 to adopt a position within opening 26. In this way the natural tendency or bias for the arm 31 and upright extending portion 22 to return it to a straight line provides the necessary resilience for the arm to bear towards or against the inboard surface 27 of upright side 24. Due to the dimensions of the arm and the size of the sides 24, 25 of opening 26 arm 31 will always be retained within the opening 26. It can be further appreciated that the shape of the body 21 will be subject to the material and the requirement to provide resilient moving arm 31, and accordingly, clip 11 may take any form or shape that is desirable, convenient, or suitable.

It can also be appreciated that the moving arm 31 comprising indentations 33,34 and 35 which cooperate with the corresponding indentations 36,37,38 of the internal surface 27 of upright side 24 of the opening 26 may not actually in effect firmly clasp the cord but may provide a closed position in which the cord is held or locked. For example, indentation 33 may be a circular diameter which is slightly larger than the diameter of the cord to be held and this in cooperation with the circular undulation 36 at the bottom of the upright side 27 forms a closed position out of which the cord cannot be removed without first applying pressure to the moving arm to move it away from the internal surface 27 of side 24.

Alternatively, clip 11 may be made with a slightly greater clearance or a sufficient clearance between the tip 75 of arm 31 and inner surface 25 so that cords of small diameter may be passed between tip 75 and surface 25 to pass into cavity or opening 45 defined between the inner surface of side 22 and the outer facing surface of arm 31. In other words arm 31 divides the U-shaped opening into opening 26 and opening 45. One or more loops of cord 16 may be accommodated within cavity 45. In use of the clip 11 in this way the last loop or one of the loops of the small diameter cable may be located in opening 26 between arm 31 and side 24 to securely retain all of the other loops in cavity 45, thus maintaining the cord in a tidy or organised manner, or shortening the length of the cord to a manageable length, such as for example a telephone extension cord or cable. Clip 11 may be used in this manner for storage of the appliances or cord or when the cord or appliance is being used.

Figure 2:
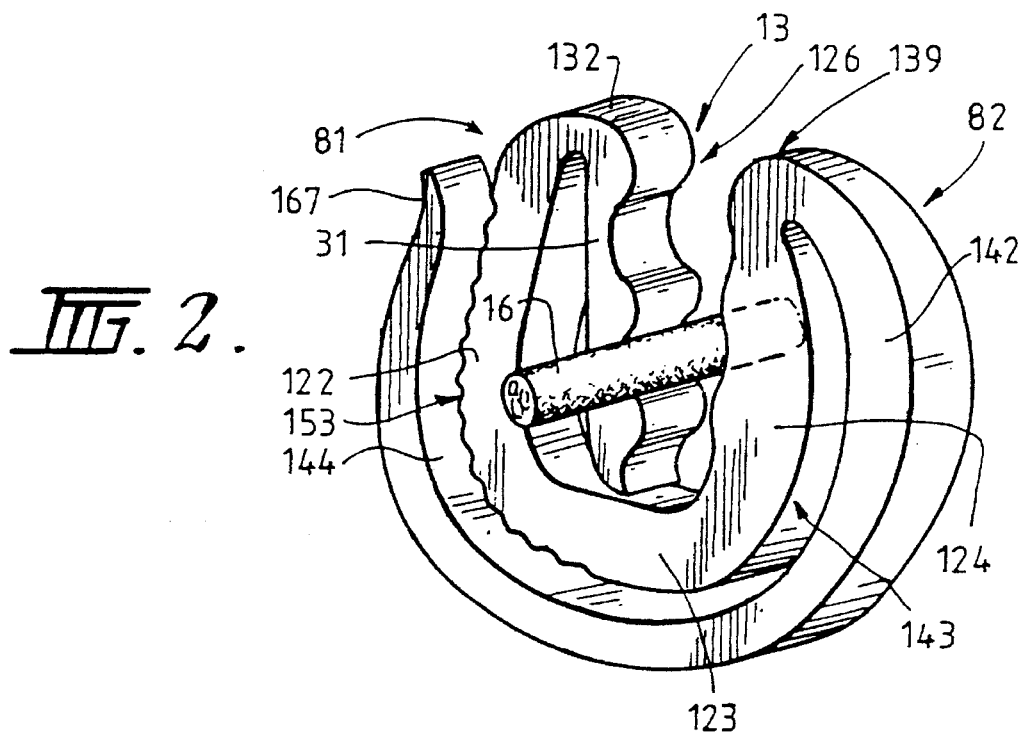
FIG. 2 is a schematic perspective side view of another form of the device in accordance with another embodiment of the present invention.

Referring to FIG. 2 there is shown a further embodiment of the present invention. The embodiment consists of a clip generally denoted as 13, in which the part shown and generally denoted as 81 is essentially the same as the body part 21 illustrated in FIG. 1 and the second part 82 of clip 13 is an extension of the length of flexible arm 41 of clip 11 which curves around body part 21. A particular difference between clip part 81 of the embodiment of FIG. 2 and the corresponding body part 21 of the embodiment of FIG. 1 is that the hinge section shown generally as 132 in FIG. 2 does not comprise a removal of material or impression or indentation to form a hinge similar to 32, but rather relies on the natural resilience of the material from which the clip is made to impart resilience on arm 31 or to allow arm 31 to deflect, particularly if moving arm 31 is formed as an extension of upright extending side 122 of clip part 81 and then bent into opening 126. Alternatively, body part 21 of clip 11 shown in FIG. 1 could also have a hinge system similar to 132 rather than one shown at 32.

The second clip part 82 of the embodiment of FIG. 2 is comprised of flexible curved arm 142 which extends curvedly around the outboard side of base 123 and upright sides 122 and 124 to define a generally convolute or U-shaped arm so that in combination with the outboard surface of upright extending side 124 of the clip part 81 arm 142 forms a curved extended opening 143,144. As shown however, the curved arm 142 extends around a substantial portion of the clip part 81 such that there is also an opening 144 formed between the inner surface of curved arm 142 and the outer surface of the other upright extending side 122 of the clip part 81. At the free or distal end of the curved arm 142 is provided a tapered tip 167 similar to the previous tapered tip 67 of arm 41 in that the taper is in the direction towards the extreme distal end of arm 142 away from the outer surface of side 122 so as to form an enlarged opening or mouth for receiving one or more loops of cord 16. The taper extends outward thereby allowing easy entrance of the cord into the opening 144 and is a leverage point for moving the curved arm 142 away from the clip part 81 to gain access to opening 144. The outboard surface of upright extending side 122 or the internal side of the curved arm 142 or both my have indentations, undulations, ribbing or other gripping means 153 which aides in gripping cords which are inserted into the opening 144 and in opening 143.

The benefit of extending opening 143 and 144 is that a plurality of loops of the cord can be stored thereon in order to further tidy the electrical cord whilst in storage. Another benefit is that in use excess cord can be looped and held within the openings 143 and/or 144 so as to effectively shorten the amount of cord extending from the appliance to the electrical power point which makes it easier to use the appliance to which the end is attached. The two sections of the extended opening 143 and 144 operate differently in that the extended opening 143 is curved and tapers to an end where the curved arm 142 connects with the upright extending side 124 which is denoted as 139. The extended opening 143 therefore in effect operates similarly to the second opening 43 of the embodiment of FIG. 1 in that the size of the opening, resilience of the material of the surrounding parts, and the tendency for the curved arm 142 to move towards the clip part 81 results in cords being gripped therein. The variable sizes of cords being accommodated by being gripped further into the opening 143 for smaller dimensions or further out in opening 143 or 144 for larger dimensions. To facilitate the insertion of the electrical cord into the extended opening 144, the tapered section 167 can be levered such that the curved arm 142 moves away from the clip part 81 and thereby expands the extended opening 143. The other part of the extended opening 144 which may extend a substantial way around clip part 81 may also rely on the resilience of the curved arm 142 to return to a position close to the clip part 81 but may also rely on a frictional gripping system comprising corrugations or other gripping projections 153 to aid in restricting the exit of cords out of the opening section 144. These gripping sections may actually hold the cord in place or trap the cord such that it cannot exit the extended opening 143 and 144. These gripping means or restricting means may be on one or other or both internal surfaces which form the opening section 144 such as 153 and may extend for a small limited portion of the opening or for a substantial portion of the opening. Due to the resilience of the curved arm 142 this opening section is able to cater for cords of any size.

Although the curved arm 142 as shown in FIG. 2 extends around to form a C-shape or at least a C-like shape around the U-shape construction of clip part 81, the curved arm 142 may wholly or partially surrounding the clip part 81.

Figure 3:
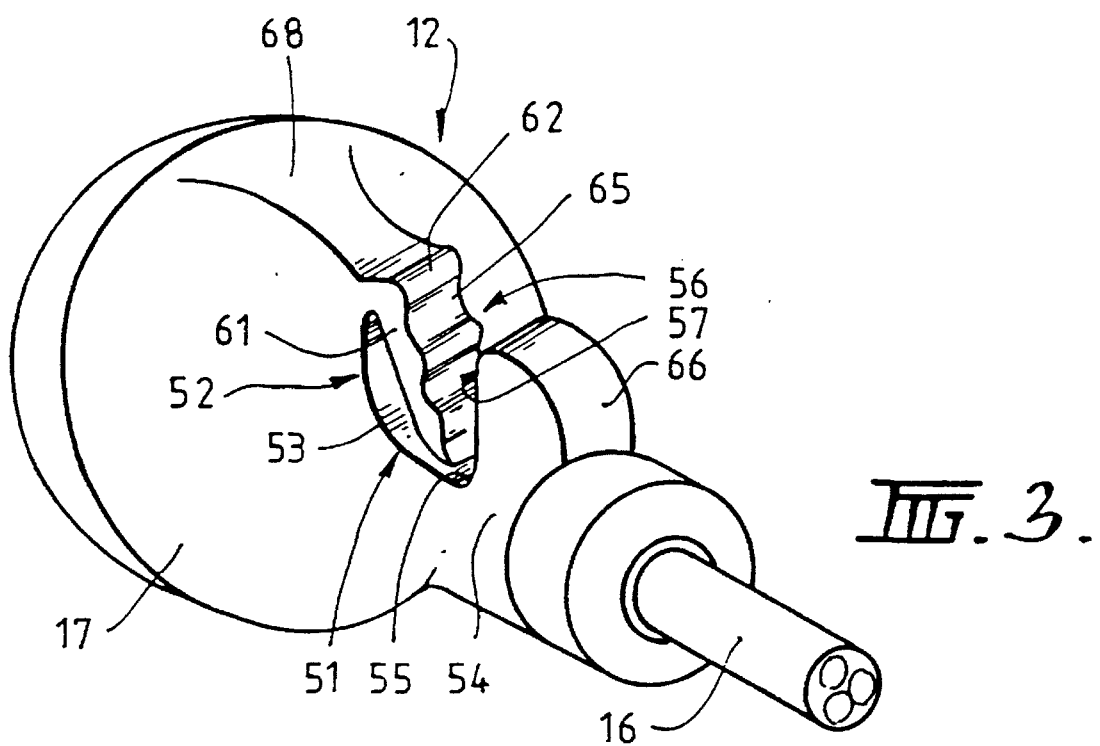
FIG. 3 is a perspective rear view of another form of the device in accordance with another embodiment of the present invention.

Referring to FIG. 3 in which a further embodiment of the present invention is shown in the form of a combination 12 of the cord retaining apparatus together with a standard power plug or similar. The combination 12 comprises a plug portion 17 which is of a conventional type and one embodiment of the cord retaining device 51 and can be sold as a separate unit to be attached to a cord, such as an electrical cord 16, after purchase or it may be included with the appliance when bought. The cord retaining device 51 has an opening 56 similar to opening 26 or 126 of the device of FIG. 1 or 2 respectively and is integrally formed with the plug 17 such as by being moulded from a single mold. Plug 17 is shaped to provide inwardly facing side 52 and more rearwardly located projection 54 having an inwardly facing surface 57. The opening 56 is defined by the inwardly facing surface 55 of base 53 and side surfaces 55,57. Device 51 also includes a moving arm 61 which is hinged at a connection point 62 in such a way that the moving arm extends down towards the internal base 55 of base 53 and tends to resiliently move towards the upright internal side 57 in order that a portion of cord (not shown) will be firmly held between the moving arm and the upright internal side 57 in a similar manner to the clip shown in FIGS. 1 and 2. The moving arm 61 also includes indentations 65 which correspond with undulations on the internal side 57 in a manner similar to the pairs of indentations 33,36; 34,37; and 35,38 of FIG. 1 in order that cords of different sizes can be held by the one plug. The plug 12 further includes surface 68 which generally slopes from the forward end of plug 12 towards the opening 56 and is of particular benefit in enabling the cord 16 to slide down the surface 68 into the opening 56. At the other side of the opening 56 is a body section 66 which is an extension of projection 54 and aides in defining internal side surface 57. This body section 66 may be of particular rigidity to enable it to be used as an aid in inserting the plug into a corresponding socket in use of this form of the device of the present invention. In one embodiment the top of body section 66 may be located at a lower plane to the leading surface 68 and thereby not hinder the insertion of cord 16 into opening 56.

Thereby in use plug 12 with integral device 51 is firmly attached to one end of the extension cord in the conventional manner and the cord after being wound or stored in some configuration, can have a portion of the extension cord held firmly in opening 56 by means of the cord being held between moving arm 61 and the internal side 57. Thereby in this form of the invention there are no further parts required for storage and the action of inserting a section of the cord into the modified part 12 does not damage the cord, is simple in use, and is highly convenient.

It should be evident from the description hereinabove that the present invention provides an improved cord retaining device and method of storage which avoids most, if not all, the disadvantages of similar devices currently available. Of course many modification to the above described embodiments may be readily envisaged by persons skilled in the art. For example, the clip may be made in one piece with the moving arm extending from one end of the body. However, the clip may also be made from a combination of pieces whereby the arm is attached to some portion of the body to provide similar resilient action of the moving arm towards an internal side of the other side defining the opening of the clip 11. Another possible advantage of this clip could be the choice of material and construction such that when the cord is inserted into opening 26 and located in cord receiving locations the arm and particularly the hinge are 32 or 132 moves across opening 26 towards the side 27 to effectively close or substantially close the opening 26 and thereby not allowing removal of the cord without force.

Since modifications within the spirit and scope of the invention may be readily effected by persons skilled in the art, it is to be understood that the invention is not limited to the particular embodiment described, by way of example, hereinabove.

Advantages of the present invention include the following:

- Two or more extension cords can be joined together with the clip of the present invention by both cords being wound around the clip so that the cords cannot be pulled apart in use.
- A cord can be safely and securely located in a secure location such as away from wet areas or off the floor by the cord being received in a plurality of clips attached to a substrate in loops or other configuration.
- Any number of clips can be used together on a single cord to maintain the cord in a looped configuration in a safe and tidy condition.
- Multiple cords may be maintained tidy and organised by a single clip in use and in storage.
- Cords of varying sizes may be retained by the one clip in a looped configuration since the clip is adjustable to receive differently sized and shaped cords or the like.

I claim:

1. A retaining device for holding at least a portion of an article or two or more articles in a tidy or organized manner by having selected portions of the article or articles attached to the device, said device not being for attachment to a separate substrate, the device comprising a body portion including a substantially u-shaped body member of a first and a second opposed side wall portions facing each other defining a first opening therebetween, said first and second side wall portions interconnected at respective one ends thereof by a web portion and a first arm portion resiliently connected to one end of the first side wall portion to extend internally into the first opening so as to divide the first opening into an open storage portion and an open retaining portion wherein first portion or portions of the article or articles can be stored in the open storage portion after passing through the open retaining portion of the device and second portion or portions of the article or articles can be retained in the open retaining portion by the action of the first resilient arm being biased towards the second wall portion, and a second arm resiliently connected to the second side wall portion defining a second opening for receiving a third portion or portions of the article or articles, said second arm curving around the outer surface of the second wall portion and web portion such that the article or articles are stored and retained in place in the tidy and organized manner when the device is attached to the respective portions of the article or articles in use.

2. A device according to claim 1 in which the first arm portion is connected to the end of the first side wall portion at the other end to the end being connected to the web portion and extends inwardly, from and in the opposite direction to the first wall portion.

3. A device according to claim 1 in which the first arm portion moves within the first opening in a direction substantially transverse to the lengthwise extending direction of the first and second opposed side wall portions.

4. A device according to claim 1 in which the first resilient arm extends into the opening to an extent which is less than the length of the first side wall portion so that a portion of the article being stored in the device can pass between the free end of the first arm and the inner surface of the web portion to gain access to the open storage portion in which the one portion or portions of the article or articles can be stored by being looped through the device.

5. A device according to claim 1 in which the first arm portion extends into the opening to an extent which is less than the length of the first side wall portion so that a portion of the article being stored in the device can pass between the free end of the first arm and the inner surface of the web portion to gain access to the open storage portion in which the one portion or portions of the article or articles can be stored by being looped through the device.

6. A device according to claim 5 in which two or more first portions of the article or articles can pass sequentially between the free end of the first arm portion and the web portion for storage in the open storage portion.

7. A device according to claim 1 in which the surface of the first arm portion facing the second side wall portion is provided with one or more indentations or article holding means for retaining the second portion or portions of the article or articles in place between the first arm and the second wall portion in the open retaining portion.

8. A retaining device according to claim 1 in which the second arm is resiliently connected to the second wall portion opposite to where the first arm is connected to the first side wall portion and the second opening for receiving third portions of the article or articles being curved in shape.

9. A device according to claim 8 in which the second resilient arm curves around the outside of the second wall portion to define the second opening which is substantially partially u-shaped or circular in shape.

10. A device according to claim 9 in which the second opening is substantially u-shaped corresponding to the shape of he u-shaped body.

11. A device according to claim 8 in which the second resilient arm curving around the outside of the second wall portion and web portion is flexible about its length.

12. A device according to claim 8 in which the second resilient arm curves around the outside of the second wall portion, the web portion and the outside of the first wall portion to define the substantially curved second opening which extends substantially around the outside of the u-shaped body from in the vicinity of where the first arm is connected to the first side wall portion to where the second arm is connected to the second side wall portion.

13. A device according to claim 8 in which the second arm has an inner surface and the inner surface of the second arm is provided with indentations or article holding means in the vicinity of the web portion and first side wall portion.

14. A device according to claim 1 in which in which the first arm is tapered in the direction towards the free end and the second arm is tapered in the direction towards the free end.

15. A device according to claim 1 in which the second opening forms a combined second storage cavity and a second article retaining opening in which the portion of the second opening closer to the point of connection between the second arm and the second side wall portion is for storing one or more turns or loops of the article or articles and the portion of the second opening closer to the web and first side wall portion is for securing the article or articles in place therebetween to prevent the turns or loops from disengaging from the second opening.

16. A device according to claim 1 in which at least a portion of the outer surface of the web portion and/or at least a part of the outer surface of the first side wall portion is provided with indentations or article holding means for retaining part of the article or articles between the inner surface of the second arm and the outer surface of the u-shaped body in the second opening.

17. A device according to claim 1 in which the second arm is moveable toward and away from the u-shaped body of the device to allow access to the second opening and to retain the article or articles in place in the second opening.

18. A device according to claim 1 in which the article is an elongate substantially flexible member or element capable of being wound repeatedly about the device in loops.

19. A device according to claim 18 in which the flexible member or element is an electrical conductor such as a plastic coated wire, cable, cord, power cord, extension cord, rope or the like.

20. A device according to claim 1 in which the article is of any shape including substantially round, circular, flat, square, rectangular, polygonal or any other shape.

21. A device according to claim 1 in combination with a plug suitable for insertion into an electrical outlet socket, said plug being connected to an appliance cord so that the appliance cord can be wound around the device and be stored and retained in place within and by the device in a tidy or organized manner, whereby part of the cord is received in the firs and/or second opening.

22. A device according to claim 21 in which the appliance cord is wound around the appliance and retained in place by the device in use in a tidy and organized manner.

23. A retaining device for retaining a cord or similar flexible member comprising a generally u-shaped body portion having a pair of opposed sides arranged on either side of the body portion to define a first opening, one of the opposed sides being provided with a resilient first arm extending internally into the first opening to divide the first opening into a storage cavity in which at least one turn or loop of the cord is stored in use of the device and a receiving opening for receiving a second portion of the cord, said first arm being biased in a direction towards the side remote from the side provided with the first arm, said first arm capable of resiliently moving transversely within the receiving opening to grip the second portion of the cord located in the receiving opening between the first arm and the other side thereby to retain the cord in the device and a second generally c-shaped resilient arm provided on the other side, said second arm extending substantially around the u-shape body from the other arm to adjacent the side provided with the first resilient arm, said second arm being spaced apart from the body over the length of the arm to define a second opening for receiving a third portion of the cord in use if required.

* * * * *